3,309,427
POLYHYDROXY PHOSPHATE ESTERS
John D. Zech and Ernest C. Ford, Jr., Wilmington, Del., assignors to Atlas Chemicals Industries, Inc., Wilmington, Del., a corporation of Delaware
No Drawing. Filed Jan. 15, 1963, Ser. No. 251,502
8 Claims. (Cl. 260—929)

This invention relates to polyhydric compounds suitable for use in making polyurethane foams and more particularly to a process for producing polyhydroxy phosphate esters suitable for such use.

Foamed polyurethane compositions from organic diisocyanates and either hydroxy-polyesters or polyhydric polyethers have a wide range of physical properties which make them potentially useful in widely divergent fields of application. For many of such potential uses, the inherent flammability of polyurethane compositions is a serious disadvantage and the problem of rendering them flame retardant has received considerable attention.

It is known to incorporate phosphorus containing compounds into the polyurethane composition, either as nonreactive plasticizing components or as resin-forming ingredients, to confer flame resistance to the finished product. Unfortunately, such modification has usually been accompanied by sacrifice of desirable characteristics, particularly dimensional stability on humid ageing.

The present invention is directed to an improved process for preparing phosphorus containing polyhydric compounds of average hydroxyl functionality greater than three which are useful in the preparation of flame-resistant rigid polyurethane foams, to the compounds so produced, their blends with other polyhydric compounds useful in polyurethane foam preparation, and to polyurethane compositions made therefrom.

The starting materials for the process of the present invention are a polyphosphoric acid, a polyhydric alcohol and an alkylene oxide. In broad terms, the polyhydric alcohol and polyphosphoric acid components are first reacted together at moderate temperatures to form acidic partial esters compositions of somewhat indefinite composition but having, in general, an average functionality, counting both hydroxyl and acidic hydrogen groups, of greater than three, and then neutralizing the residual acidity by reaction with an alkylene oxide.

Throughout this specification and in the appended claims the term "a polyphosphoric acid" is meant to include phosphoric acid anhydride ($P_2O_5$) and hydrates thereof containing two or more phosphorus atoms per mol. It is preferred to employ in the process of the invention, the anhydride itself or a polyphosphoric acid containing at least 80% thereof. Particularly preferred is a polyphosphoric acid containing from 82 to 84% $P_2O_5$.

Polyhydric alcohols, preferred for use in the first stage of preparation indicated above, are liquid polyhydric alcohols selected from the group consisting of (a) base polyols having from 2 to 9 hydroxyl groups per mol and hydroxyl numbers ranging from 1250 to 1860 and (b) their adducts with up to twice their own weight of 2- to 4-carbon alkylene oxides. An illustrative list of polyhydric alcohols so-defined includes ethylene, diethylene and triethylene glycols; propylene and dipropylene glycols, butylene glycol; glycerol; methyl glycerol, ethylene oxide adducts of glycerol containing up to 4 oxyethylene groups per mol; propylene oxide adducts of glycerol containing up to 4 oxypropylene groups per mol; propylene oxide adducts of sorbitol or of mannitol containing up to 6 oxypropylene groups per mol; propylene oxide adducts of sucrose containing up to 10 oxypropylene groups per mol; epichlorhydrin adducts of sorbitol containing up to 4 hydroxy-chloropropyl groups per mol; and the like.

In accordance with the invention a polyhydric alcohol as defined above, is first caused to react with a polyphosphoric acid to form an acidic partial ester. Preferably, the proportion of polyhydric alcohol to polyphosphoric acid taken is at least sufficient, together with any water of composition in the phosphoric acid component, to convert all phosphorus present to the orthophosphate form. It is further preferred that the proportion of polyhydric alcohol reacted with the polyphosphoric acid be sufficiently small to insure that the average functionality of the resulting acidic partial ester composition is greater than 3.1. When the reacting polyhydric alcohol is dihydric this preferred condition is met by keeping the ratio (on a molar basis) of the sum of the polyhydric alcohol and water of hydration in the polyphosphoric acid to $P_2O_5$ at a value no greater than 2.75. When the reacting polyhydric alcohol is trihydric or of higher functionality the proportion may be higher without objectionably decreasing the functionality but the introduction of more than enough of such polyol than required to bring the ratio of the sum of polyol and water of hydration to $P_2O_5$ to a value greater than 3 is not preferred.

The polyhydric alcohol and polyphosphoric acid are brought together under reaction conditions sufficiently mild that esterification between P—OH and alcoholic hydroxyl groups with concomitant liberation of water is avoided. For example, $P_2O_5$ in dry powder form, or as a slurry in an inert diluent such as toluene, may be added gradually to the polyhydric alcohol while maintaining the temperature in the range of from 50° to 150° C., and preferably below about 100° C. The reaction is complete when all the $P_2O_5$ is dissolved. When employing a hydrated polyphosphoric acid the reaction with polyhydric alcohols goes so readily that external heat need not be applied. In fact, in the interest of obtaining light colored products it is highly preferred to control the temperature, by external cooling, or by limiting the rate of introduction of one reactant into the other, to below about 60° C. It is sometimes advantageous, to obtain more rapid mixing and better heat transfer, to carry out the reaction in the presence of an inert diluent, preferably a solvent for the polyol and/or the resulting acidic partial ester.

The following equations illustrate the types of partial esters which may be formed employing reactants and reaction conditions described above.

(1) Phosphoric anhydride and glycerol $P_2O_5 + 2CH_2OHCHOHCH_2OH \longrightarrow$

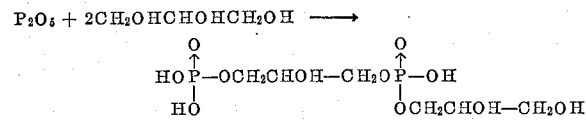

(2) Tripoly phosphoric acid and a glycol

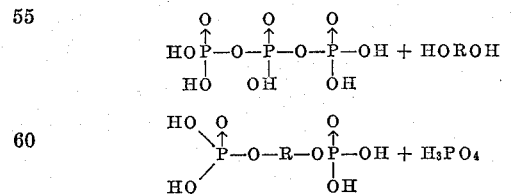

It will be observed that in the first reaction a penta functional partial ester is obtained and, in the second the product is an equimolar mixture of tetra functional ester and tri functional acid. The composition thus has an average functionality of 3.5.

In the second stage of the process of the invention the acidic partial phosphoric ester composition is reacted with a sufficient quantity of a 1,2-alkylene oxide to substantially neutralize the acidity. Suitable alkylene oxides are those containing from 2 to 4 carbon atoms. Alkylene oxides which are substituted, for example, the epihalohydrins, may be employed as well as unsubstituted epoxides. Ethylene oxide, propylene oxide, 1,2-butylene oxide, and epichlorhydrin are exemplary of those which may suitably be employed. The alkylene oxide is added gradually to the agitated reaction mass from the first stage while controlling the temperature, particularly in the early stages, to below 100° C. and preferably below 50° C. The reaction is followed by periodically noting the acid number and the alkylene oxide addition continued until the acid number levels off at a low value. Unreacted alkylene oxide and diluent, if such has been employed, are stripped from the neutralized product under reduced pressure and moderately elevated temperatures to yield, as final product, a substantially neutral polyhydroxy phosphate ester.

The resulting polyhydroxy esters are suitable components for reaction with organic polyisocyanates in preparing rigid polyurethane foams having in combination, good flame retardance and humid ageing characteristics. Those derived from the higher valent polyols, e.g., propylene oxide-sorbitol adducts, may, if desired, be employed as the sole polyhydroxy component in the polyurethane formulation or, alternatively, be used in admixture with other, non-phosphorylated polyhydroxy materials of average functionality of at least 3. Those derived from the lower valent polyols, particularly hydroxylated phosphoric esters in accordance with the invention wherein the polyhydric alcohol reacted in the first stage is a diol are blended with another, preferably tetra- or higher-valent, polyol such, for example, as the polyoxyalkylene ether of a tetritol, hexitol, etc. Such blends containing as little as 1.5% phosphorus by weight are effective to reduce the flammability of rigid polyurethane foams made therefrom. For higher flame-retardance blends containing higher proportions of phosphorus, up to about 5%, may be employed without sacrifice of excellent physical properties in the foam. Suitable higher valent polyols for preparing blends of the type referred to include propylene oxide adducts of diglycerol, 1,4-sorbitan, erythritol, methyl glucoside, xylitol, sorbitol, mannitol, glucose, or sucrose, said adducts having hydroxyl numbers ranging from about 400 to 900.

A particularly preferred group of compositions comprise blends of (A) from 30 to 60 weight percent of the polyhydroxy phosphate ester product obtained by first reacting from 0.5 to 1.0 mols of propylene glycol with one mol (based on $P_2O_5$) of a polyphosphoric acid containing from 82 to 84 weight percent of $P_2O_5$ to form an acidic partial ester and then reacting the said partial ester with sufficient propylene oxide to substantially neutralize the acidity and (B) correspondingly from 70 to 40 weight percent of a polyoxypropylene ether of sorbitol having a hydroxyl number of from 400–900.

Flame retardant polyurethane foams are prepared by reacting polynuclear aromatic polyisocyanates with the polyhydroxy phosphate esters prepared in accordance with the process hereinbefore described, or with blends thereof with the higher polyvalent polyhydric compounds defined hereinbefore in the presence of known catalysts for the urethane reaction and foaming agents. Polyisocyanates which may be employed in the formation of the fire retardant foams of the invention include naphthalene diisocyanate, p,p'-diphenyl diisocyanate, p,p'-diphenyl oxide diisocyanate, p,p'-diphenyl methane diisocyanate, p,p'-diphenyl isopropylidene diisocyanate, dimethylene triphenyl triisocyanate, and the like.

The invention will be more readily understood from a consideration of the following examples which are presented for illustrative purposes and are not to be construed as limiting the invention. Throughout the examples the molar proportions of the polyphosphoric acid component are expressed as mols of $P_2O_5$.

*Example I*

770 g. (4.5 mols) of polyphosphoric acid (83% $P_2O_5$) were charged to a 5-L 3-necked flask equipped with stirrer, thermometer, $CO_2$ inlet, dropping funnel and water cooled condenser. A $CO_2$ blanket was started at a rate of 100 cc./min. 400 cc. dioxane were added and the stirrer started. 171 g. (2.25 mols) propylene glycol were slowly added with no heat being applied to the reaction mass. When the reaction exotherm started, a cold water bath was applied to minimize temperature rise. After all the propylene glycol was charged, the mass was held at 30–35° C. for 30 minutes. Propylene oxide was then slowly added, the rate of addition being such that temperature did not exceed 45–50° C. In a period of 11 hours, 2500 grams (44.6 mols) were so added and the charge was essentially neutralized.

The dioxane and excess propylene oxide were then stripped off using final conditions of <0.1 mm. vac. at 75° C. The resulting product was a clear, moderately viscous liquid which analyzed AN=0.6, OH=326 and percent P=8.9. A yield of 3095 was obtained.

*Example II*

228 grams (3 mols) of propylene glycol dissolved in 250 ml. dioxane were charged into an agitated reaction flask through which a current of carbon dioxide was led to maintain an inert atmosphere. The flask was submerged in a water bath at 23° C. and 513 grams (3 mols) of a commercial polyphosphoric acid (83% $P_2O_5$) added gradually over a period of a half hour. The maximum temperature reached in the reaction mixture was 49° C. When the temperature had receded to 28° C. (20 minutes stirring while cooling in the 23° bath) the flow of carbon dioxide was stopped and the addition of propylene oxide started at a rate such that the reaction temperature did not exceed 50° C. In the course of 6 hours 1800 grams (32.3 mols) of propylene oxide were added, and the acid number of the reacting mixture had leveled off. After standing overnight the product was stripped at a maximum temperature of 80° C. at less than 1 mm. pressure to remove dioxane and unreacted propylene oxide. The yield was 2404 grams of a water-white, syrupy polyhydric phosphate ester having an acid number of 1.1, a hydroxyl number of 367 and containing 7.7% phosphorus.

*Example III*

Following the general procedure described in Example I, 410 g. (2.4 mols) of polyphosphoric acid (83% $P_2O_5$) were reacted with 221 g. (2.4 mols) anhydrous glycerol in the presence of 200 cc. dioxane. The formed partial ester was neutralized by adding 1644 g. (29.7 mols) propylene oxide over a period of 9 hours.

The dioxane and excess propylene oxide were then stripped off using final conditions of <0.1 mm. vac. at 75° C. The resulting product was a clear, moderately viscous liquid which analyzed AN=0.8, OH=361 and percent P=7.0. A yield of 2175 g. was obtained.

*Example IV*

342 g. (2.0 mols) of polyphosphoric acid (83% $P_2O_5$) were reacted with 184 g. (2 mols) anhydrous glycerol in the presence of 250 cc. dioxane. The intermediate glycerol phosphate was then reacted with 634 g. (10.8 mols) propylene oxide followed by reaction with 723 g. (16.4 mols) ethylene oxide. The latter was added by bubbling gaseous ethylene oxide through the reaction mass at 30–40° C. until an essentially neutral ester was obtained and vacuum stripping to remove dioxane and unreacted alkylene oxide. The resulting product (1883 g.) was a clear, low viscosity liquid which analyzed AN=2, OH=376 and percent P=6.8.

Example V 171 g. of polyphosphoric acid (83% $P_2O_5$) were reacted with 290 g. (0.7 mol) of a polyoxypropylene ether of sorbitol containing approximately four oxypropylene groups per mol in the presence of 200 cc. dioxane. 605 g. (10.4 mols) propylene oxide were slowly added over a period of 10 hours to yield an essentially neutral ester. The dioxane and excess propylene oxide were then stripped off using final conditions of <0.1 mm. vac. at 80° C. The yield was 909 grams of a light colored moderately viscous liquid which analyzed AN=1.5, OH=372 and perecnt P=7.9.

Example VI 552 g. (6.0 mols) of anhydrous glycerol were charged to a 3–L 3-necked flask equipped with stirrer, thermometer, $CO_2$ inlet, dropping funnel and water cooled condenser. A $CO_2$ blanket was started at a rate of 100 cc./minute. Heat was applied and the temperature raised to 105–110° C. 425 g. (3 mols) phosphorus pentoxide slurried in 850 g. toluol were then slowly added over a period of one hour. The mass was held at 100–105° C. for 30 minutes and then cooled to 80° C. The acidic partial ester was neutralized by the slow addition of 1614 g. (28.8 mols) of propylene oxide. The toluol and excess propylene oxide were then stripped off using final conditions of <0.1 mm. vac. at 108° C. The resulting product was a clear, moderately viscous liquid which analyzed AN=1.6, OH=402 and percent P=7.8. A yield of 2397 was obtained.

Example VII 532 g. (2.0 mols) of a glycerol-propylene oxide adduct containing 3 oxypropylene groups per mol were reacted in the presence of 200 cc. dioxane with 142 g. (1.0 mol) phosphorus pentoxide the latter being added in 25 g. increments over a period of one hour, the temperature being maintained at 90–95° C. during the reaction period. The temperature was then lowered to 25° C. A total of 464 g. (8.3 mols) propylene oxide were then reacted over a period of 10 hours at which point an essentially neutral ester was obtained. The dioxane and excess propylene oxide were then stripped off using final conditions of <1.0 mm. vac. at 75° C. The resulting product was a clear moderately viscous liquid which anlayzed AN=1.0, OH=321 and percent P=6. A yield of 1026 g. was obtained.

Example VIII 828 g. (2 mols) of a sorbitol-propylene oxide adduct containing 4 oxypropylene groups per mol were reacted at 105–110° C. with 213 g. (1.5 mols) of phosphorus pentoxide slurried in 500 cc. toluol, the latter being slowly added over a period of 1 hour. This intermediate was then neutralized at 40–45° C. by adding 812 g. (14.0 mols) propylene oxide over a period of 20 hours. The product was then filtered. Toluene and excess propylene oxide were then stripped off using final conditions of <0.1 mm. vac. at 120° C. The product was a viscous, amber liquid which analyzed AN=2.0, OH=326 and percent P=5.8. A yield of 1814 g. was obtained.

Example IX 513 g. (3.0 mols) of polyphosphoric acid (83% $P_2O_5$) were reacted with 228 g. (3.0 mols) of propylene glycol in the presence of 400 ml. dioxane as described in Example II. The resulting acid partial ester was then reacted with 1500 g. (16.2 mols) epichlorohydrin slowly added over a period of 5 hours while maintaing a temperature of 35–40° C. The neutralization was completed by adding 800 g. (14.3 mols) propylene oxide over a period of 3 hours, while maintaining a temperature of 35–40° C.

The dioxane and excess propylene oxide were then stripped off using final conditions of <0.1 mm. vac. at 80° C. The resulting product (2832 gram) was a moderately viscous, clear liquid which analyzed AN=3.7, OH=318, percent P=6.9 and percent Cl=20.6.

Example X

The procedure of Example IX was repeated with the variation that only 114 g. (1.5 mols) of propylene glycol were employed in the first stage and the amount of propylene oxide consumed in neutralizing the acidic ester was 507 g. (8.8 mols). The net yield obtained was 2634 grams of a moderately viscous, clear liquid ester was acid number=4, hydroxyl number=297, percent P=7.2 and percent Cl=22.0.

Example XI 50 parts by weight of the product of Example I were blended with 50 parts by weight of a sorbitol-propylene oxide adduct containing 6 oxypropylene groups per mol. The resulting polyhydric mixture exhibited a phosphorus content of 4.5% and a hydroxyl number of 468.

Example XII

A rigid polyurethane foam of good flame resistance was prepared by stirring into 45.7 parts by weight of diphenyl methane diisocyanate (Mondur MR) a preformed mixture comprising 37.3 parts by weight of the product of Example XI, 1 part of a silicone surfactant (DC 113), 1 part of catalyst comprising a 50/50 mixture of dimethyl ethanol amine and dibutyl tin dilaurate and 15 parts of trichlorofluoromethane.

Example XIII 60 parts by weight of the product of Example I were blended with 40 parts by weight of a sorbitol-propylene oxide adduct containing an average of 4.4 oxypropylene groups per mol. The resulting polyhydric mixture had a hydroxyl number of 581 and a phosphorus content of 5.3%.

Example XIV

A rigid flame resistant polyurethane foam was prepared following the procedure of Example XII in every respect except that 50.1 weight parts of the diisocyanate were employed and 39.2 parts of the product of Example XIII were employed instead of the product of Example XI.

Example XV

A mixed polyhydric alcohol composition comprising 60 weight parts of a propylene oxide adduct of sucrose containing 8 oxypropylene groups per mol and 40 weight parts of the product of Example II and having a hydroxyl number of 490 was employed in the following formula to form a rigid polyurethane foam of excellent flame resistance and humid ageing characteristics:

| | Weight parts |
|---|---|
| Polymethylene polyphenyl isocyanate [1] | 45.6 |
| Polyhydric alcohol mixture | 36.9 |
| Silicone surfactant | 1.0 |
| Tetramethyl butane diamine | 0.6 |
| Trichlorofluoromethane | 16.0 |

[1] A commercial product described by the supplier as having a molecular weight of 381–400 and containing 3-NCO groups.

Example XVI

A mixed polyhydric alcohol composition comprising 60 weight parts of a propylene oxide adduct of sorbitol containing 6 oxypropylene groups per mol and 40 weight parts of the product of Example II and having a hydroxyl number of 408 was employed in the following formula to form a rigid polyurethane foam of excellent flame reristance and excellent dimensional stability on exposure to high humidity and high temperature:

| | Weight parts |
|---|---|
| Polymethylene polyphenyl isocyanate [1] | 46.7 |
| Polyhydric alcohol mixture | 36.3 |
| Silicone surfactant | 1.0 |
| Tetramethyl butane diamine | 0.8 |
| Triethanol amine | 0.2 |
| Trichlorofluoromethane | 15.0 |

[1] A commercial product described by the supplier as having a molecular weight of 381–400 and containing 3-NCO groups.

What is claimed is:

1. A process for making a polyhydroxy phosphate ester which comprises a first stage of forming an acidic partial ester by reaction of a polyphosphoric acid containing at least 80% by weight of phosphoric anhydride with a polyhydric alcohol and a second stage of reacting the said acidic partial ester with sufficient of an alkylene oxide having from 2 to 4 carbon atoms to substantially neutralize the acidity, wherein the said polyhydric alcohol is a polyhydric alcohol selected from the group consisting of base polyols having from 2 to 9 hydroxyl groups per mol and hydroxyl numbers of from about 1250 to about 1850, and their condensates with up to twice their own weight of 2-to-4 carbon alkylene oxides, and wherein, in the first stage, the ratio of the sum of the mols of said polyhydric alcohol and the mols of water of composition in the polyphosphoric acid to mols of $P_2O_5$ in the reacting mixture is no greater than 2.75 when the said polyhydric alcohol is a diol and is no greater than 3 when the said polyhydric alcohol is of functionality greater than 3 but, in any case, is at least sufficient to convert all the phosphorus present to the orthophosphate form.

2. A process as in claim 1 wherein the said polyphosphoric acid is phosphoric anhydride.

3. A process as in claim 1 wherein the said polyhydric alcohol is propylene glycol and the said alkylene oxide is propylene oxide.

4. A process as in claim 1 wherein the said polyhydric alcohol is a polyoxypropylene ether of sorbitol containing from 4 to 6 oxypropylene groups per mol and the said alkylene oxide is propylene oxide.

5. A polyhydroxy phosphate ester produced by the process of claim 1.

6. The polyhydroxy phosphate ester product obtained by first reacting from 0.5 to 1.0 mol of propylene glycol with one mol (based on $P_2O_5$) of a polyphosphoric acid containing from 82 to 84 weight percent of $P_2O_5$ to form an acidic partial ester and then reacting the said partial ester with sufficient propylene oxide to substantially neutralize the acidity.

7. A polyhydroxy composition comprising a blend of a phosphate ester of claim 5 with a non-phosphorylated polyhydric alcohol having an average functionality of at least 3, said blend containing from 1.5% to 5.0% by weight of phosphorus.

8. A polyhydroxy composition comprising from 30 to 60 weight percent of the product of claim 6 and correspondingly from 70 to 40 weight percent of a polyoxypropylene ether of sorbitol having a hydroxyl number of from 400–900.

References Cited by the Examiner

UNITED STATES PATENTS

| 2,372,244 | 3/1945 | Adams et al. | 260—461 |
| 2,830,069 | 4/1958 | Smith | 260—461 |
| 3,007,884 | 11/1961 | Kaplan et al. | 260—2.5 |
| 3,026,275 | 3/1962 | Muller et al. | 260—2.5 |
| 3,159,644 | 12/1964 | Bartlett | 260—978 |

CHARLES B. PARKER, *Primary Examiner.*

DONALD E. CZAGA, *Examiner.*

F. M. SIKORA, J. J. KLOCKO, *Assistant Examiners.*